W. O. AMSLER.
METHOD OF MAKING PRODUCER GAS.
APPLICATION FILED FEB. 26, 1908.
979,818.
Patented Dec. 27, 1910.
2 SHEETS—SHEET 2.
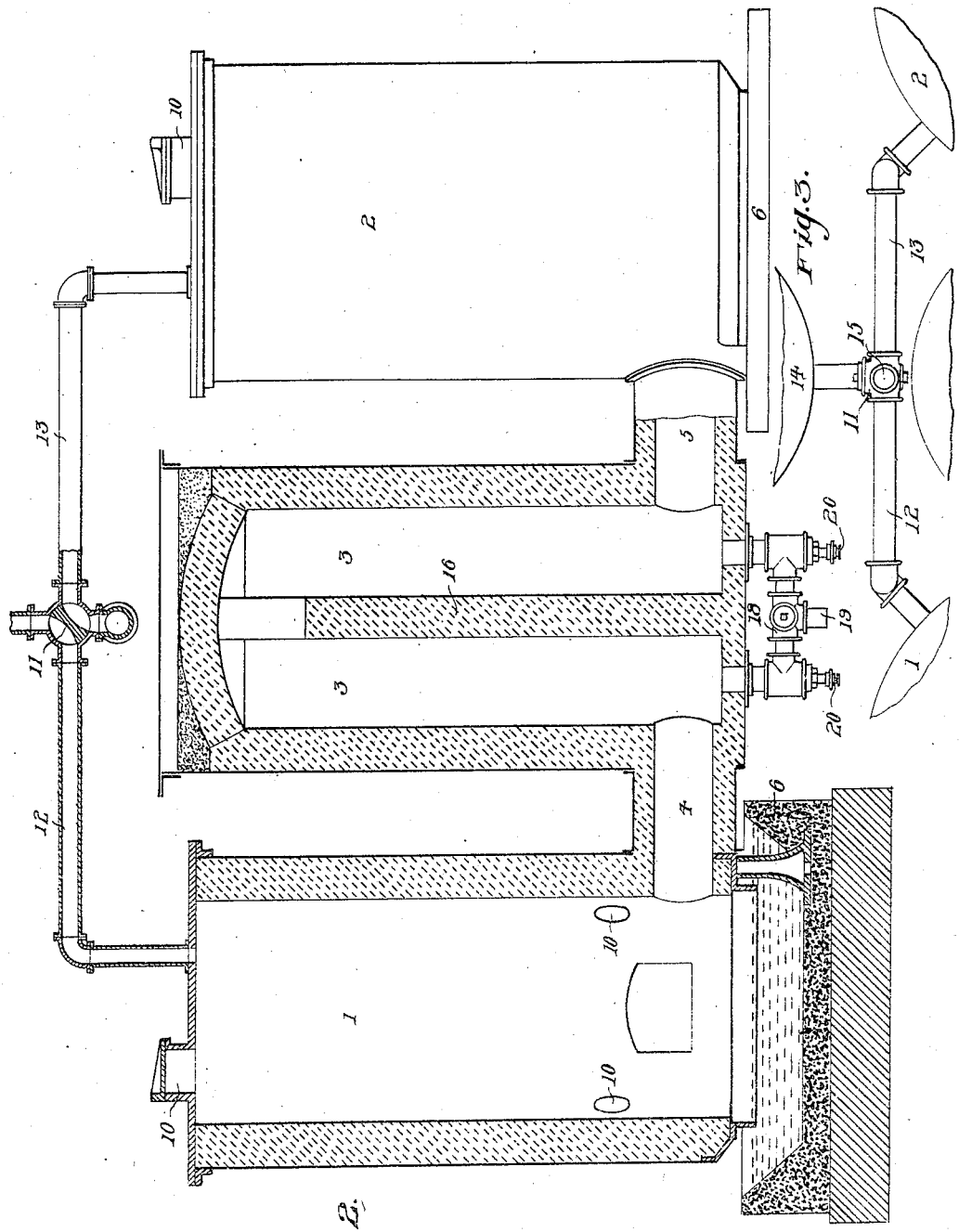

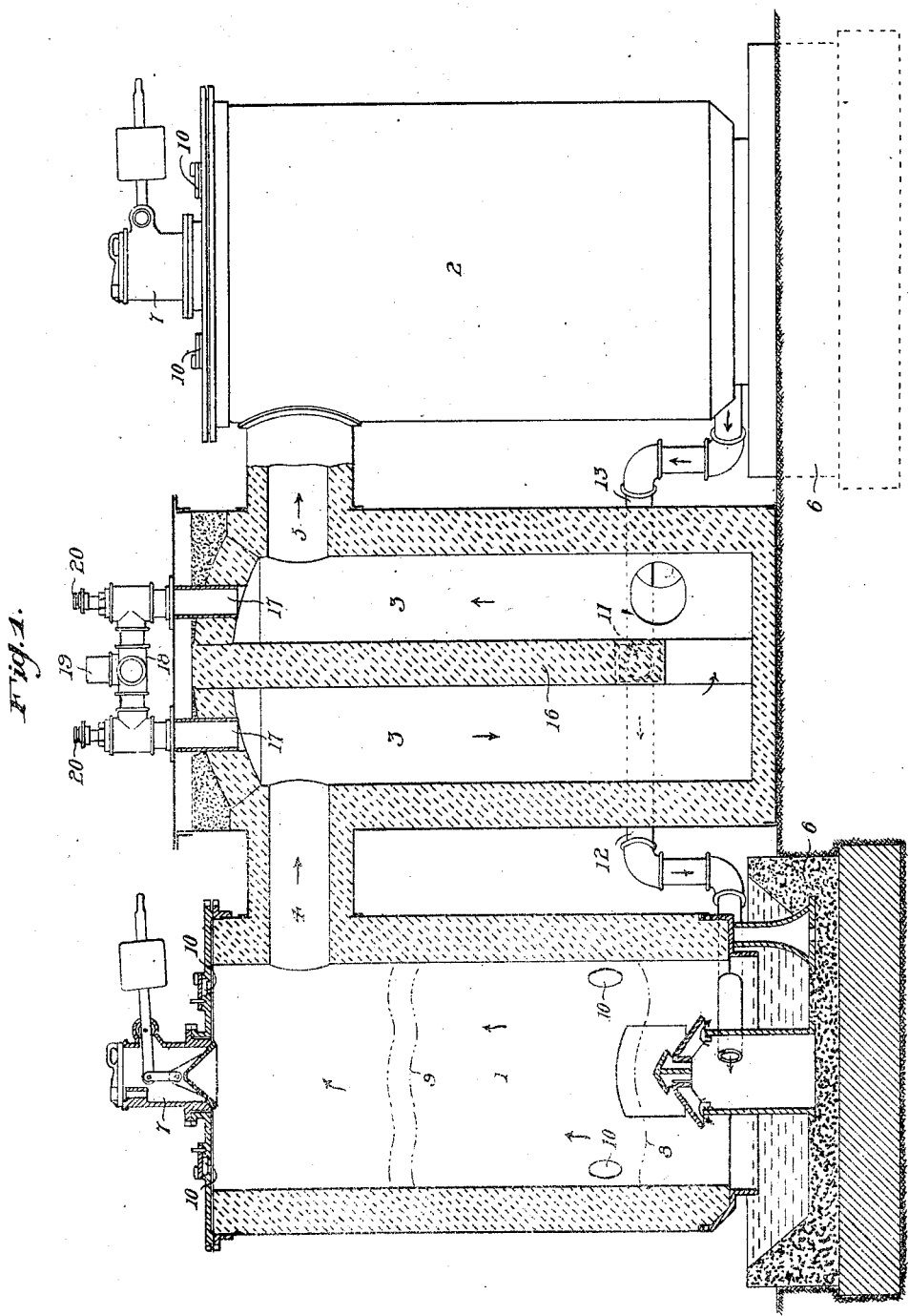

UNITED STATES PATENT OFFICE.

WALTER O. AMSLER, OF PITTSBURG, PENNSYLVANIA.

METHOD OF MAKING PRODUCER-GAS.

979,818.  Specification of Letters Patent.  Patented Dec. 27, 1910.

Application filed February 26, 1908. Serial No. 417,835.

*To all whom it may concern:*

Be it known that I, WALTER O. AMSLER, of Pittsburg, in the county of Allegheny and State of Pennsylvania, have invented certain new and useful Improvements in Methods of Making Producer-Gas, of which the following is a specification.

In the accompanying drawings, which illustrate two forms of apparatus for carrying out my improved method of making producer-gas, Figure 1 is a part sectional and a part elevational view of apparatus constructed in accordance with my invention; Fig. 2 a similar view showing a modified form of apparatus; and Fig. 3, a diagrammatic view particularly showing the manner of connecting the producers proper and a scrubber.

The prime object of my invention is to provide a new and improved method of making producer-gas from bituminous or tar containing fuels that will be entirely free of tar and all other volatile hydrocarbons.

The producer-gas made under my process of manufacture will be a highly efficient gas consisting of carbon monoxid, hydrogen and nitrogen free of all volatile hydrocarbons.

In carrying out my method of making producer-gas as above mentioned my invention consists, broadly stated, in first generating in a gas-producer a gas, then completely oxidizing this gas and afterward recarbonizing it.

The gas generated in the first step of my process will consist of carbon monoxid, carbon dioxid, hydrogen, marsh gas, nitrogen and complex hydrocarbons of the marsh gas series. This producer-gas is objectionable for some commercial purposes owing to the presence of the tar and other volatile hydrocarbons. In order to eliminate the tar and other volatile hydrocarbons, the gas from the producer is passed to a combustion-chamber or large passage into which air is admitted and in which said gas is oxidized. The resultant gas will be composed of carbon dioxid, water, and nitrogen. From the combustion or oxidizing-chamber or passage, the gas is then recarbonized by causing it to be passed through a highly heated mass of carbonaceous material. The producer-gas thus made will be entirely free of all volatile hydrocarbons and be a mixture comprising only carbon monoxid, hydrogen and nitrogen.

Referring to the accompanying drawings, and first to the form of apparatus shown by Fig. 1, which illustrates a suction gas-producer plant, I employ two gas-producers 1 and 2 and an intermediate combustion chamber 3. The combustion-chamber or enlarged combustion-passage is disposed between the two producers and is connected with the same by passages 4 and 5. Each of the producers is supported over a pit or trough 6 adapted to contain a quantity of water to form a water-seal, as is usual in producers of the type illustrated.

The fuel employed in the manufacture of the producer-gas, which, in my method, is bituminous coal or some other comparatively cheap tar containing fuel, is introduced to the respective producers through a charging-opening 7 formed in the top of each producer.

In operating the plant illustrated, a small quantity of green bituminous coal is introduced to a producer and rests upon a bed of highly heated carbonaceous material from which all volatile matter has been distilled. This highly heated bed extends upwardly from the ash line 8 to the dotted and waved line 9, which latter indicates the bottom of the layer of green coal. Each of the producers is provided with poke-holes 10.

11 designates a four-way valve in communication with each of the producers by pipes 12 and 13, with a scrubber 14 (see Fig. 3) and with a pipe 15 open to the atmosphere. By means of the construction just described, air is caused to pass to one producer and the manufactured gas discharged from the other producer. The gas from the last mentioned producer is sucked into the scrubber and from thence drawn into and utilized in an engine not shown. It is evident that the air may be introduced to the producers under pressure instead of by suction as in the plant illustrated.

In Fig. 1, I have shown by arrows the course of travel of the air to producer 1, and the course of the gases from said producer through passage 4, combustion-chamber 3, passage 5, through the second producer 2 and from thence to the four-way reversing valve 11. Upon a reversal of the said valve 11 the air is first directed into the producer 2 and the gases therefrom travel through the passage 5, combustion-chamber 3, passage 4 to producer 1, and from thence to the scrubber by means of the passages shown.

The combustion-chamber 3 is divided into two compartments by a wall 16 and each compartment at its upper end has an air inlet pipe or passage 17 adapted to admit air to the said compartments. Each of the passages 17 communicate with and are controlled by a three-way valve 18, which latter is in communication with a pipe 19 open to the atmosphere.

To enable an operator to see within the compartments, suitable means 20 are provided.

The gas generated in the first producer 1 is passed to the combustion-chamber and as it enters said chamber is met with a sufficient quantity of air introduced thereto through passage 17 to completely oxidize the gas during its travel through the combustion-chamber. This oxidized gas is then recarbonized by being passed down through the fuel contained in producer 2.

In the form of Fig. 2, I have shown a modified form of apparatus. In this form the air introduced to each producer is admitted at the top and the gases drawn off at the bottom and passed to the combustion-chamber into which air is admitted at the bottom of the chamber.

What I claim is:

1. The method of making gas which consists in generating a producer-gas in a gas-producer, oxidizing the gas in a combustion-chamber, recarbonizing the resultant gas by passing it through a second gas-producer containing a bed of carbonaceous residue, reversing the flow of gases, introducing a tar-containing-fuel into the second producer, and then passing the gas generated in the second producer through the combustion-chamber and through a carbonaceous residue formed in the first producer.

2. The method of making gas which consists in generating a producer-gas by passing air through a highly heated bed of carbonaceous material and a body of green bituminous material contained in a gas-producer, oxidizing the gas, recarbonizing the resultant gas by passing it through a second gas-producer containing a highly heated bed of carbonaceous residue formed therein from green bituminous material and from which a producer-gas has been generated, reversing the flow of gases, introducing a tar-containing-fuel into the second gas-producer, and then passing the gas generated in the second producer through the combustion-chamber and through a carbonaceous residue formed in the first producer.

In testimony whereof I affix my signature in presence of two witnesses.

WALTER O. AMSLER.

Witnesses:
W. G. DOOLITTLE,
A. C. WAY.